(12) United States Patent
Kishiyama et al.

(10) Patent No.: US 8,971,286 B2
(45) Date of Patent: Mar. 3, 2015

(54) MOBILE TERMINAL APPARATUS AND RADIO BASE STATION APPARATUS FOR USE IN MULTIPLE MOBILE COMMUNICATION SYSTEMS

(75) Inventors: Yoshihisa Kishiyama, Kanagawa (JP); Motohiro Tanno, Kanagawa (JP); Mamoru Sawahashi, Kanagawa (JP)

(73) Assignee: NTT DOCOMO, INC., Tokyo (JP)

( * ) Notice: Subject to any disclaimer, the term of this patent is extended or adjusted under 35 U.S.C. 154(b) by 733 days.

(21) Appl. No.: 13/120,075

(22) PCT Filed: Sep. 18, 2009

(86) PCT No.: PCT/JP2009/066341
§ 371 (c)(1),
(2), (4) Date: Jun. 24, 2011

(87) PCT Pub. No.: WO2010/032812
PCT Pub. Date: Mar. 25, 2010

(65) Prior Publication Data
US 2011/0249657 A1    Oct. 13, 2011

(30) Foreign Application Priority Data

Sep. 22, 2008  (JP) ................................. 2008-243357
Jun. 24, 2009  (JP) ................................. 2009-150297

(51) Int. Cl.
 *H04W 4/00*    (2009.01)
 *H04W 72/00*   (2009.01)
 (Continued)

(52) U.S. Cl.
 CPC ........... *H04L 5/0037* (2013.01); *H04J 11/0069* (2013.01); *H04L 5/0007* (2013.01);
 (Continued)

(58) Field of Classification Search
 USPC ............... 370/310–350; 455/422.1, 437, 450, 455/464, 550.1, 509, 435.1, 436, 524, 525
 See application file for complete search history.

(56) References Cited

U.S. PATENT DOCUMENTS

2007/0093253 A1* 4/2007 Lindoff et al. ................. 455/450
2009/0156225 A1* 6/2009 Angelow et al. .............. 455/450
(Continued)

FOREIGN PATENT DOCUMENTS

WO    WO/2008/038367    *   4/2008   ............ H04W 36/08

OTHER PUBLICATIONS

Nokia Siemens Networks, et al., "Autonomous component carrier selection for LTE-Advanced," 3GPP TSG RAN WG1 #54 Meeting, R1-083103, Aug. 18, 2008, 4 pages.
(Continued)

*Primary Examiner* — Habte Mered
(74) *Attorney, Agent, or Firm* — Osha Liang LLP

(57) ABSTRACT

A mobile terminal apparatus and radio base station apparatus supporting each of a plurality of mobile communication systems when the plurality of mobile communication systems coexists, where the mobile terminal apparatus performs a cell search using an SCH signal included in one downlink CC among a plurality of downlink CCs, and where the radio base station apparatus broadcasts a DBCH signal including information of an uplink CC paired with an initial downlink CC including the SCH signal obtained by the cell search, and transmits a response signal of an RACH signal from the mobile terminal apparatus to the mobile terminal apparatus in the initial downlink CC, and where the mobile terminal apparatus transmits a shared channel signal including information of a transmission/reception bandwidth of the mobile terminal apparatus to the radio base station apparatus in the uplink CC, and where the radio base station apparatus transmits a control signal including assignment information of a downlink CC and an uplink CC based on the information of the transmission and reception bandwidth of the mobile terminal apparatus to the mobile terminal apparatus, and where the radio base station apparatus and the mobile terminal apparatus communicate with each other in the downlink CC and the uplink CC based on the assignment information after random access.

8 Claims, 10 Drawing Sheets

(51) Int. Cl.
- *H04L 5/00* (2006.01)
- *H04J 11/00* (2006.01)
- *H04W 48/16* (2009.01)
- *H04W 72/08* (2009.01)
- *H04W 74/08* (2009.01)

(52) U.S. Cl.
CPC ............. *H04L 5/001* (2013.01); *H04L 5/0053* (2013.01); *H04L 5/0062* (2013.01); *H04L 5/0092* (2013.01); *H04W 48/16* (2013.01); *H04W 72/085* (2013.01); *H04W 74/0833* (2013.01)
USPC ........................................... 370/330; 455/450

(56) References Cited

U.S. PATENT DOCUMENTS

| | | | |
|---|---|---|---|
| 2009/0259909 A1* | 10/2009 | Luo | 714/748 |
| 2009/0316659 A1* | 12/2009 | Lindoff et al. | 370/332 |
| 2010/0075694 A1* | 3/2010 | Damnjanovic et al. | 455/452.2 |
| 2011/0059767 A1* | 3/2011 | Parkvall et al. | 455/550.1 |
| 2011/0128942 A1* | 6/2011 | Kim et al. | 370/336 |
| 2011/0134868 A1* | 6/2011 | Lee et al. | 370/329 |
| 2011/0143796 A1* | 6/2011 | Lee et al. | 455/507 |
| 2011/0194514 A1* | 8/2011 | Lee et al. | 370/329 |
| 2012/0188986 A1* | 7/2012 | Kawasaki et al. | 370/331 |
| 2013/0176959 A1* | 7/2013 | Parkvall et al. | 370/329 |

OTHER PUBLICATIONS

Qualcomm Europe, "Carrier Aggregation Operation in LTE-Advanced," 3GPP TSG RAN WG1 #54, R1-083193, Aug. 18, 2008, 4 pages.

3GPP TR 25.912 V7.1.0, Sep. 2006, "Feasibility study for evolved Universal Terrestrial Radio Access (UTRA) and Universal Terrestrial Radio Access Network (UTRAN)," 57 pages.

International Search Report issued in PCT/JP2009/066341, mailed on Jan. 12, 2010, 1 page.

Decision to Grant a Patent issued in corresponding Japanese Application No. 2012-257889, mailed Sep. 17, 2013 (4 pages).

* cited by examiner

MOBILE TERMINAL APPARATUS AND RADIO BASE STATION APPARATUS FOR USE IN MULTIPLE MOBILE COMMUNICATION SYSTEMS

TECHNICAL FIELD

The present invention relates to a mobile terminal apparatus and radio base station apparatus in next-generation mobile communication systems.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been discussed (Non-patent Document 1). In LTE, as a multiplex system, OFDMA (Orthogonal Frequency Division Multiple Access) different from W-CDMA is used in downlink, and SC-FDMA (Single Carrier Frequency Division Multiple Access) is used in uplink.

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been discussed (for example, LTE Advancement (LTE-A)). Accordingly, in the future, it is expected that a plurality of these mobile communication systems will coexist, and configurations (radio base station apparatus, mobile terminal apparatus, etc.) capable of supporting a plurality of these systems are considered necessary.

CITATION LIST

Non-Patent Literature

[Non-Patent Literature 1]
3GPP, TR25. 912 (V7.1.0), "Feasibility study for Evolved UTRA and UTRAN", September 2006

SUMMARY OF INVENTION

Technical Problem

The present invention was made in view of the respect, and it is an object of the invention to provide a mobile terminal apparatus and radio base station apparatus supporting each of a plurality of mobile communication systems when the plurality of mobile communication systems coexists.

Solution to Problem

A mobile terminal apparatus of the invention is characterized by having cell search means for performing a cell search using a synchronization channel signal included in one downlink component carrier among a plurality of downlink component carriers, dynamic broadcast channel signal receiving means for receiving a dynamic broadcast channel signal including information of an uplink component carrier paired with an initial downlink component carrier including the synchronization channel signal obtained by the cell search, uplink center frequency control means for controlling a transmission center frequency of an uplink signal based on the information of the uplink component carrier, random access channel signal generating means for generating a random access channel signal, uplink shared channel signal generating means for generating an uplink shared channel signal, and control signal receiving means for receiving a control signal of the initial downlink component carrier.

A radio base station apparatus of the invention is characterized by having dynamic broadcast channel signal generating means for generating a dynamic broadcast channel signal including information of an uplink component carrier paired with a downlink component carrier, shared channel signal receiving means for receiving a shared channel signal including information of a transmission/reception bandwidth of a mobile terminal apparatus in the uplink component carrier paired with an initial downlink component carrier including a synchronization channel signal used in a cell search, and downlink control signal generating means for generating a downlink control signal including assignment information of a downlink component carrier and an uplink component carrier.

Technical Advantage of the Invention

In the invention, the mobile terminal apparatus performs a cell search using a synchronization channel signal included in one downlink component carrier among a plurality of downlink component carriers, the radio base station apparatus broadcasts a dynamic broadcast channel signal including carrier aggregation information concerning an initial downlink component carrier including the synchronization channel signal obtained by the cell search and information of an initial uplink component carrier paired with the initial downlink component carrier, and transmits a response signal to a random access channel signal from the mobile terminal apparatus to the mobile terminal apparatus using the initial downlink component carrier, the mobile terminal apparatus transmits a shared channel signal including information of a transmission/reception bandwidth of the mobile terminal apparatus to the radio base station apparatus using the initial uplink component carrier, the radio base station apparatus transmits a shared channel signal including assignment information of a downlink component carrier and an uplink component carrier to the mobile terminal apparatus based on the information of the transmission/reception bandwidth of the mobile terminal apparatus, and after random access, communicates with the mobile terminal apparatus in the downlink component carrier and the uplink component carrier based on the assignment information, and therefore, even when a plurality of mobile communication systems coexists, it is possible to perform the initial access procedure corresponding to each of the mobile communication systems.

DESCRIPTION OF EMBODIMENTS

Figure 1:
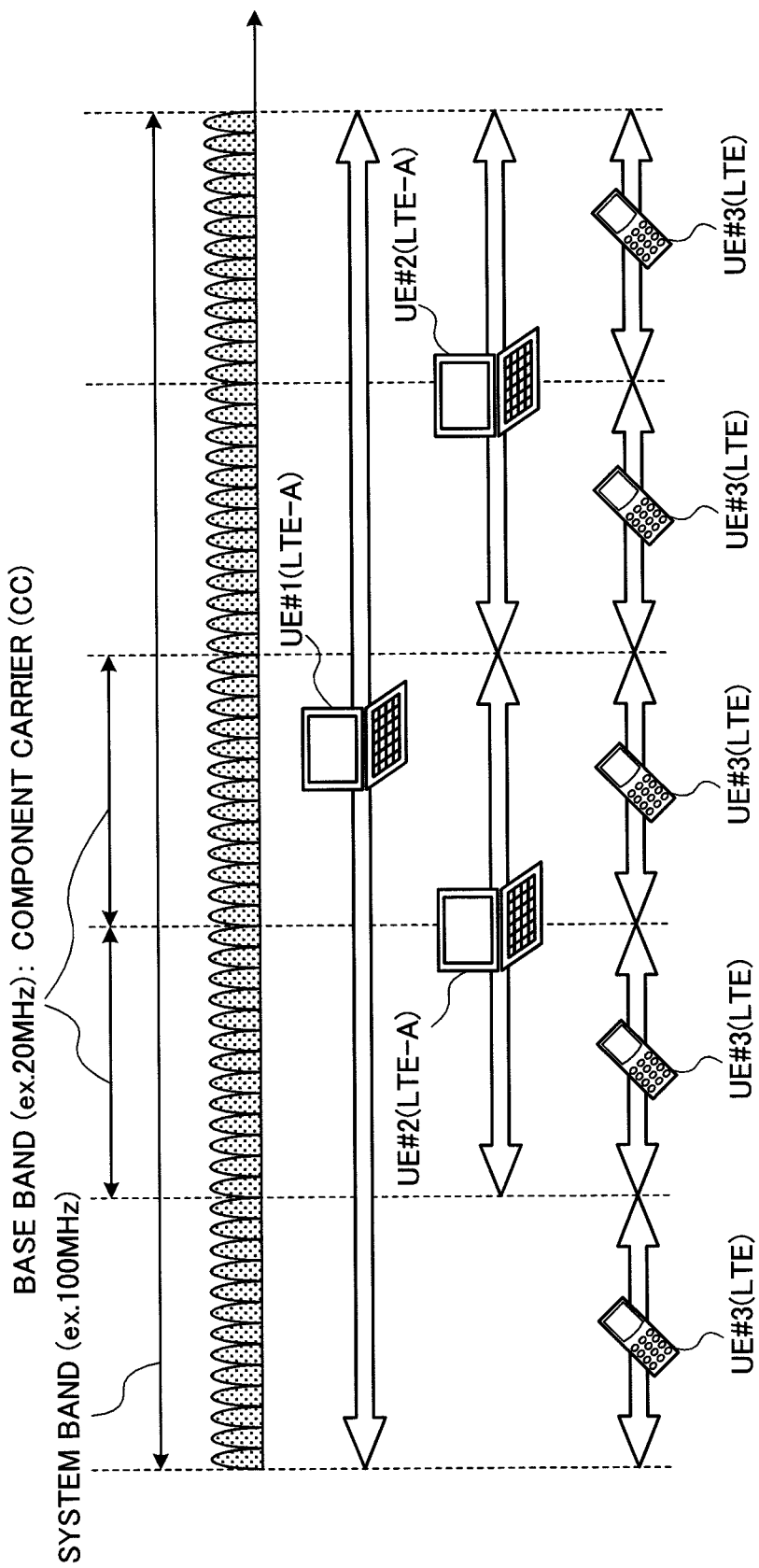
FIG. 1 is a diagram to explain system bands in the LTE system.

FIG. 1 is a diagram to explain a frequency usage state when mobile communications are performed in downlink. An example as shown in FIG. 1 indicates the frequency usage state in the case of coexistence of an LTE-A system that is a first mobile communication system having a first system band that is relatively wide, and an LTE system that is a second mobile communication system having a second system band that is relatively narrow. In the LTE-A system, for example, wireless communications are performed in a variable system bandwidth of 100 MHz or less, and in the LTE system, wireless communications are performed in a variable system bandwidth of 20 MHz or less. The system band of the LTE-A system is at least one basic frequency region (component carrier: CC) with the system band of the LTE system as a unit. Thus integrating a plurality of base frequency bands to broaden the band is referred to as Carrier Aggregation.

For example, in FIG. 1, the system band of the LTE-A system is a system band (20 MHz×5=100 MHz) containing bands of five component carriers with the system band (base band: 20 MHz) of the LTE system as a single component carrier. In FIG. 1, a mobile terminal apparatus UE (User Equipment) #1 is a mobile terminal apparatus supporting the LTE-A system (also supporting the LTE system) and has a system band of 100 MHz, UE#2 is a mobile terminal apparatus supporting the LTE-A system (also supporting the LTE system) and has a system band of 40 MHz (20 MHz×2=40 MHz), and UE#3 is a mobile terminal apparatus supporting the LTE system (not supporting the LTE-A system) and has a system band of 20 MHz (base band).

Figure 2:
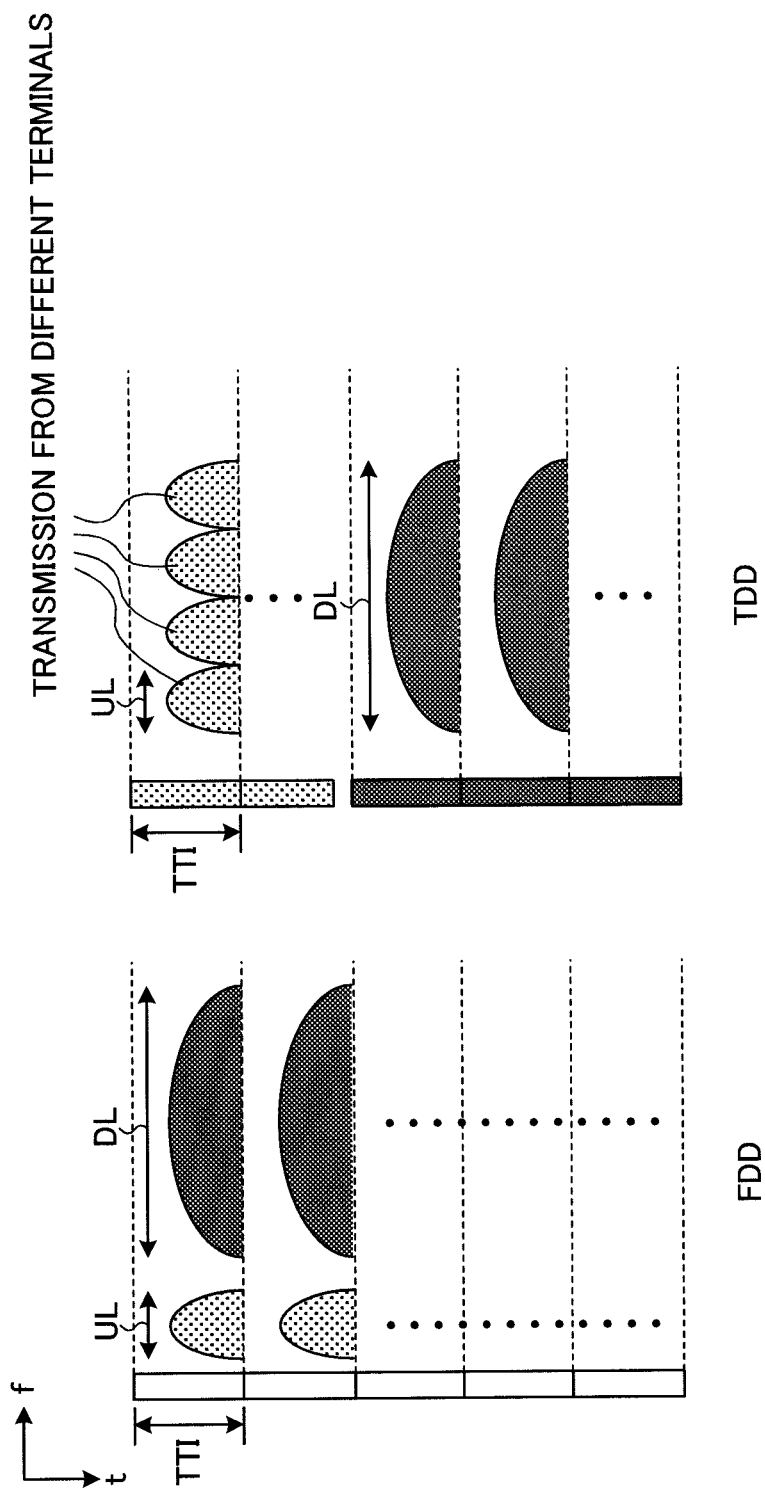
FIG. 2 is a diagram to explain asymmetry of frequency bands in downlink and uplink.

In wireless communications in thus broaden frequency band, it is expected that the frequency band assigned to downlink and the frequency band assigned to uplink are asymmetric. For example, as shown in FIG. 2, in Frequency Division Duplex (FDD), uplink (UL) and downlink (DL) channels have asymmetric bandwidths at a single transmission time interval (TTI). In Time Division Duplex (TDD), a plurality of uplink channels is assigned to the bandwidth of downlink, and uplink (UL) and downlink (DL) channels have asymmetric bandwidths.

The processing procedure used in the LTE system is not capable of supporting such systems in which the uplink (UL) channel and downlink (DL) channel have asymmetric bandwidths. Therefore, even in systems capable of using a broadened frequency band, only the basic frequency band can be supported, and it is not possible to effectively use the broadened frequency band.

The inventors of the invention noted the above-mentioned respect and reached the invention. In other words, it is the gist of the invention that the mobile terminal apparatus performs a cell search using a synchronization channel signal included in one downlink component carrier among a plurality of downlink component carriers, the radio base station apparatus broadcasts a dynamic broadcast channel signal including carrier aggregation information concerning an initial downlink component carrier including the synchronization channel signal obtained by the cell search and information of an initial uplink component carrier paired with the initial downlink component carrier, and transmits a response signal to a random access channel signal from the mobile terminal apparatus to the mobile terminal apparatus using the initial downlink component carrier, the mobile terminal apparatus transmits a shared channel signal including information of a transmission/reception bandwidth of the mobile terminal apparatus to the radio base station apparatus using the initial uplink component carrier, the radio base station apparatus transmits a shared channel signal including assignment information of a downlink component carrier and an uplink component carrier to the mobile terminal apparatus based on the information of the transmission/reception bandwidth of the mobile terminal apparatus, and after random access, communicates with the mobile terminal apparatus in the downlink component carrier and the uplink component carrier based on the assignment information, and that by this means, even when a plurality of mobile communication systems coexists, wireless communications, particularly, the initial access procedure are performed corresponding to each of the mobile communication systems.

An Embodiment of the invention will specifically be described below with reference to accompanying drawings. Described herein is the case of using a mobile terminal apparatus supporting the LTE-A system.

Figure 3:
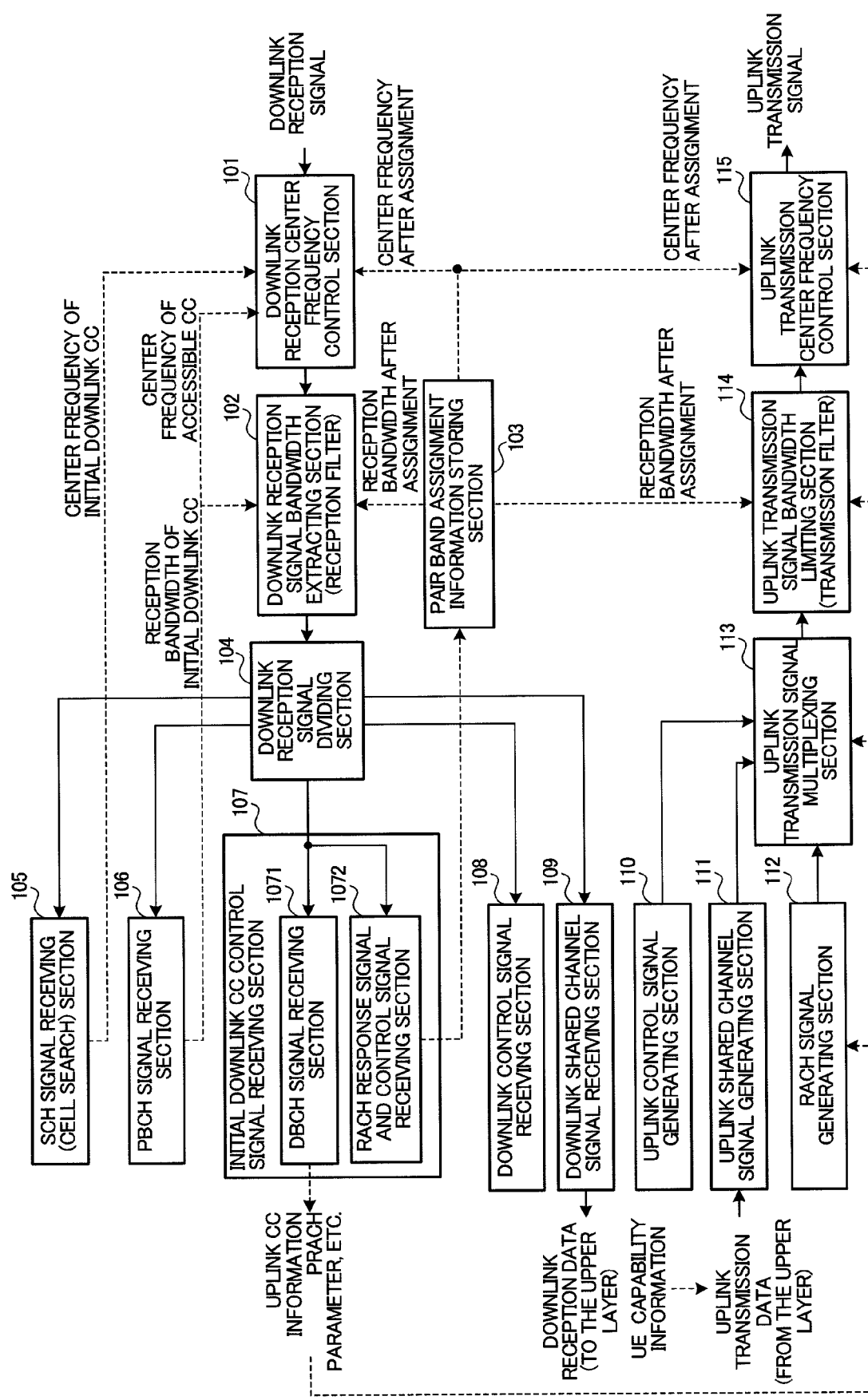
FIG. 3 is a diagram illustrating a schematic configuration of a mobile terminal apparatus according to an Embodiment of the invention.

FIG. 3 is a block diagram illustrating a configuration of the mobile terminal apparatus according to an Embodiment of the invention. The mobile terminal apparatus as shown in FIG. 3 is provided with a reception processing section and a transmission processing section. The reception processing section has a downlink reception center frequency control section 101 that controls a downlink reception center frequency, a downlink reception signal bandwidth extracting section 102 that is a reception filter for extracting a bandwidth of a downlink reception signal, a downlink reception signal dividing section 104 that divides the downlink reception signal, an SCH (Synchronization Channel) signal receiving section (cell search section) 105 that receives a Synchronization Channel (SCH) signal, a PBCH (Physical Broadcast Channel) signal receiving section 106 that receives a signal of a Physical Broadcast Channel signal, an initial downlink CC control signal receiving section 107 that receives a control signal of an initial component carrier (CC), a downlink control signal receiving section 108 that receives a downlink control signal, and a downlink shared channel signal receiving section 109 that receives a downlink shared channel signal. The initial downlink CC control signal receiving section 107 has a Dynamic Broadcast Channel (DBCH) signal receiving section 1071 that receives a broadcast information (DBCH) signal, and an RACH response signal and control signal receiving section 1072 that receives an RACH response signal, and control signal (MAC (Media Access Control)/RRC (Radio Resource Control) signal).

The transmission processing section has an uplink control signal generating section 110 that generates an uplink control signal, an uplink shared channel signal generating section 111 that generates an uplink shared channel signal, a random access channel (RACH) signal generating section 112 that generates a random access channel signal, an uplink transmission signal multiplexing section 113 that multiplexes an uplink transmission signal, an uplink transmission signal bandwidth limiting section 114 that is a transmission filter for limiting the bandwidth of the uplink transmission signal, and an uplink transmission center frequency control section 115 that controls an uplink transmission signal center frequency.

Further, the mobile terminal apparatus has a pair band assignment information storing section 103 that stores assignment information of a downlink component carrier and an uplink component carrier (pair band).

The downlink reception center frequency control section 101 receives information of the center frequency of a downlink component carrier (initial downlink CC) in a cell search in the SCH signal receiving section 105 from the SCH signal receiving section 105, and based on the information of the center frequency, controls (shifts) the downlink reception center frequency. Further, the downlink reception center frequency control section 101 controls (shifts) the downlink reception center frequency based on the assignment information of the downlink CC and the uplink CC. The information of the controlled downlink reception center frequency is sent to the downlink reception signal bandwidth extracting section 102. Furthermore, the downlink reception center frequency control section 101 receives information of the center frequency of an accessible CC in the PBCH signal from the PBCH signal receiving section 106, and based on the information of the center frequency, controls (shifts) the downlink reception center frequency.

The downlink reception signal bandwidth extracting section 102 extracts the bandwidth of the downlink reception signal based on the initial downlink CC information included in the Physical Broadcast Channel signal received in the PBCH signal receiving section 106 i.e. the information of the bandwidth of the initial downlink CC among the information of the bandwidth of the initial downlink CC, the number of antenna, etc. Thus filtered reception signal is sent to the downlink reception signal dividing section 104. Further, the downlink reception signal bandwidth extracting section 102 extracts the bandwidth of the downlink reception signal based on the assignment information of the downlink CC and the uplink CC. More specifically, the reception signal is subjected to filtering by the reception filter set for the bandwidth of the initial downlink CC (or accessible CC) using the downlink reception center frequency.

The downlink reception signal dividing section 104 divides the downlink reception signal into the SCH signal, PBCH signal, downlink control signal (layer1/layer2 control signal), and downlink shared channel signal. Then, the downlink reception signal dividing section 104 sends the SCH signal to the SCH signal receiving section 105, sends the PBCH signal to the PBCH signal receiving section 106, sends the downlink control signal to the downlink control signal receiving section 108, and outputs the downlink shared channel signal to the downlink shared channel signal receiving section 109. The downlink shared channel signal output to the downlink shared channel signal 109 is sent to the upper layer as downlink reception data. When the downlink reception signal dividing section 104 receives an initial downlink CC control signal as a downlink reception signal in initial access, the section 104 divides the signal into a Dynamic Broadcast channel signal (DBCH signal), RACH response signal, and control signal (MAC/RRC control signal). Then, the downlink reception signal dividing section 104 sends the broadcast information signal (DBCH signal) to the Dynamic Broadcast Channel signal receiving section 1071, and outputs the RACH response signal and control signal to the RACH response signal and control signal receiving section 1072.

The SCH signal receiving section 105 performs a cell search using a Synchronization Channel signal included in one downlink component carrier among a plurality of downlink component carriers. At this point, a frequency block including the Synchronization Channel signal obtained by the cell search is regarded as the initial downlink CC. Then, the SCH signal receiving section 105 outputs the information of the center frequency of the initial downlink CC to the downlink reception center frequency control section 101 as feedback.

The PBCH signal receiving section 106 receives the Physical Broadcast Channel signal broadcast from the radio base station apparatus. The PBCH signal receiving section 106 extracts the initial downlink CC information included in the Physical Broadcast Channel signal i.e. the information of the bandwidth of the initial downlink CC among the information of the bandwidth of the initial downlink CC, the number of antenna, etc. to output to the downlink reception signal bandwidth extracting section 102. Further, since the PBCH signal includes the information (center frequency, etc.) of the CC (accessible CC) capable of receiving the DBCH, the PBCH signal receiving section 106 extracts the information of the accessible CC from the PBCH signal to output to the downlink reception center frequency control section 101.

The Dynamic Broadcast Channel signal receiving section 1071 receives a broadcast channel signal (Dynamic Broadcast Channel signal (DBCH)) including the information (bandwidth and center frequency) of an uplink CC paired with the initial downlink CC including the Synchronization Channel signal obtained by the cell search. The Dynamic Broadcast Channel signal receiving section 1071 outputs the information of the uplink CC to the uplink transmission signal bandwidth limiting section 114 and the uplink transmission center frequency control section 115 as feedback. Thus, the information of the uplink CC is output to the uplink transmission signal bandwidth limiting section 114 and the uplink transmission center frequency control section 115 as feedback, and it is thereby possible to perform uplink transmission in the uplink CC paired with the initial downlink CC.

Further, as well as the information of the uplink CC paired with the initial downlink CC, the broadcast channel signal preferably includes the carrier aggregation information (the total bandwidth of aggregated CCs, or the number of aggregated CCs, and the center frequency thereof) concerning the initial downlink CC, a random access channel parameter specific to the mobile terminal apparatus supporting the LTE-A, and the center frequency of a CC for transmitting paging information specific to the mobile terminal apparatus supporting the LTE-A. In this case, the Dynamic Broadcast Channel signal receiving section 1071 outputs the carrier aggregation information and the center frequency of the CC for transmitting the paging information to the uplink transmission signal bandwidth limiting section 114 and the uplink transmission center frequency control section 115 as feedback, and outputs the random access channel parameter specific to the mobile terminal apparatus supporting the LTE-A system to the RACH signal generating section 112. The Dynamic Broadcast Channel signal receiving section 1071 outputs the carrier aggregation information to the uplink transmission signal bandwidth limiting section 114 and the uplink transmission center frequency control section 115 as feedback, and it is thereby possible to transmit uplink signals at the wide band. Further, the Dynamic Broadcast Channel signal receiving section 1071 outputs the random access channel parameter specific to the mobile terminal apparatus supporting the LTE-A system to the RACH signal generating section 112, and it is thereby possible to notify the radio base station apparatus of whether the mobile terminal apparatus is an LTE-A-capable terminal using the RACH signal. Furthermore, the center frequency of the CC for transmitting the paging information is output to the uplink transmission signal bandwidth limiting section 114 and the uplink transmission center frequency control section 115 as feedback, and it is thereby possible to receive the paging information in an idle mode.

The RACH response and control signal receiving section 1072 receives the RACH response signal and control signal (MAC/RRC signal). Since the control signal (MAC/RRC signal) includes the assignment information of the downlink CC and uplink CC (pair band), the pair band assignment information is output to the pair band assignment information storing section 103. The pair band assignment information storing section 103 stores the pair band assignment information. After pair band assignment, the pair band assignment information is used in the downlink reception center frequency control section 101, downlink reception signal bandwidth extracting section 102, uplink transmission signal bandwidth limiting section 114 and uplink transmission center frequency control section 115.

The uplink shared channel signal generating section 111 generates an uplink shared channel signal using uplink transmission data from the upper layer. The uplink transmission data from the upper layer includes the information (capability information) of the transmission/reception bandwidth of the mobile terminal apparatus. The mobile terminal apparatus thus transmits the information of the transmission/reception bandwidth of the mobile terminal apparatus to the radio base station apparatus using an uplink transmission signal, and the radio base station apparatus is thereby capable of efficiently performing assignment of the pair band in uplink and downlink.

The RACH signal generating section 112 generates an RACH signal (preamble and message). The RACH signal may include identification information (specific signal sequence) of the LTE-A system specific to the mobile terminal apparatus supporting the LTE-A system. By this means, it is possible to notify the radio base station apparatus of whether the mobile terminal apparatus is an LTE-A-capable terminal using the RACH signal.

The uplink transmission signal multiplexing section 113 multiplexes the uplink control signal generated in the uplink control signal generating section 110, the uplink shared channel signal generated in the uplink shared channel signal generating section 111, and the RACH signal generated in the RACH signal generating section 112. The uplink transmission signal multiplexing section 113 outputs the multiplexed transmission signal to the uplink transmission signal bandwidth limiting section 114.

The uplink transmission signal bandwidth limiting section 114 limits the uplink transmission signal bandwidth based on the uplink CC information (bandwidth and center frequency) from the Dynamic Broadcast Channel signal receiving section 1071. Thus filtered transmission signal is output to the uplink transmission center frequency control section 115. Further, the uplink transmission signal bandwidth limiting section 114 limits the bandwidth of the uplink transmission signal based on the assignment information of the downlink CC and uplink CC. More specifically, the transmission signal is subjected to filtering using the transmission filter set for the bandwidth of the uplink CC using the uplink transmission center frequency.

The uplink transmission center frequency control section 115 controls (shifts) the uplink transmission center frequency based on the uplink CC information (bandwidth and center frequency) from the Dynamic Broadcast Channel signal receiving section 1071. Further, the uplink transmission center frequency control section 115 controls (shifts) the uplink transmission center frequency based on the assignment information of the downlink CC and the uplink CC.

Figure 4:
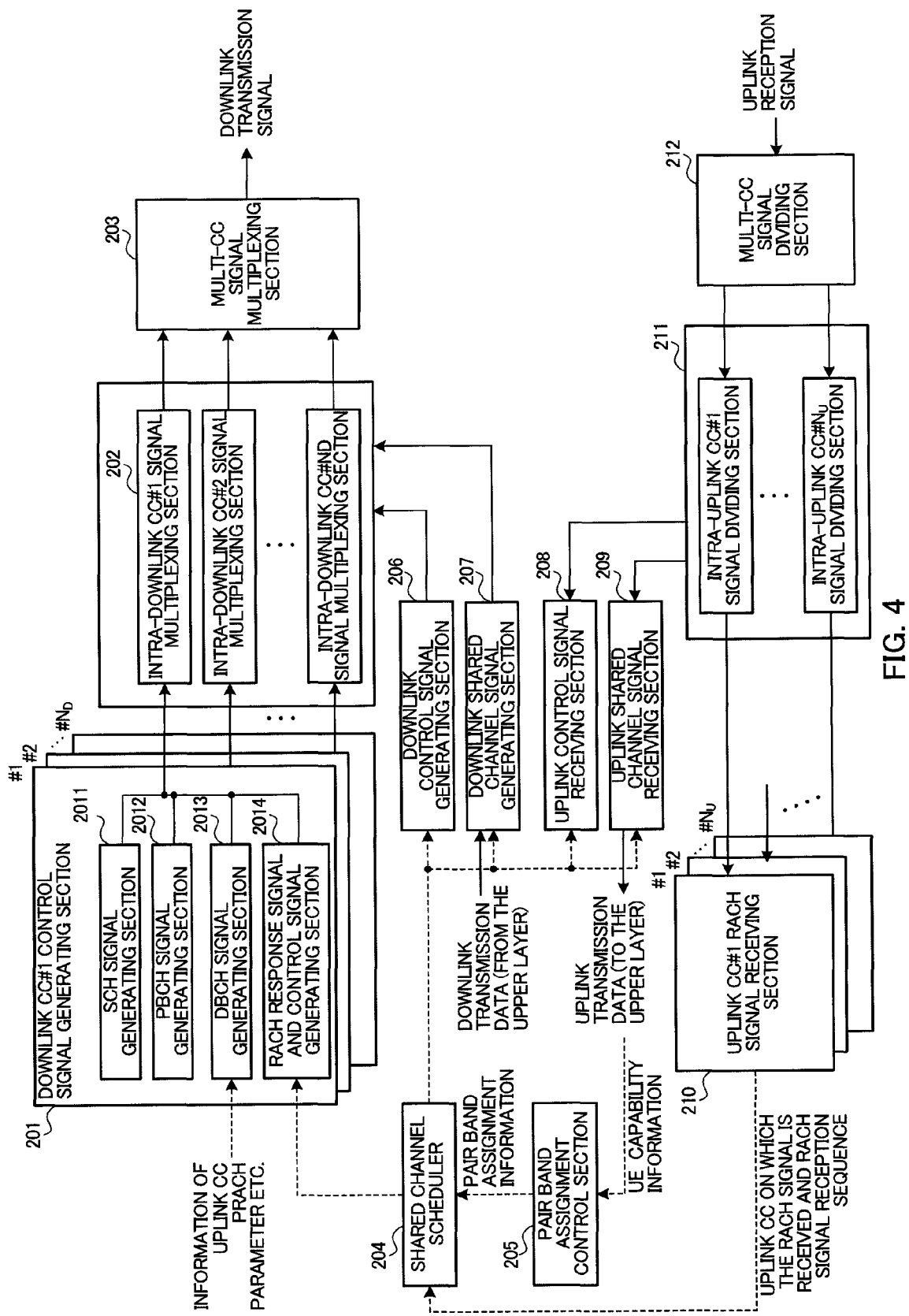
FIG. 4 is a diagram illustrating a schematic configuration of a radio base station apparatus according to the Embodiment of the invention.

FIG. 4 is a block diagram illustrating a configuration of the radio base station apparatus according to the Embodiment of the invention. The radio base station apparatus as shown in FIG. 4 is provided with a transmission processing section and a reception processing section. The transmission processing section has a downlink CC control signal generating section 201 that generates a downlink component carrier (downlink CC) control signal, a downlink control signal generating section 206 that generates a downlink control signal (layer1/layer2 control signal), a downlink shared channel signal generating section 207 that generates a downlink shared channel signal, an intra-downlink CC signal multiplexing section 202 that multiplexes intra-downlink CC signals (downlink CC control signal, and downlink control signal and downlink shared channel signal) for each downlink CC, and multi-CC signal multiplexing section 203 that multiplexes multiplexed downlink CC signals. The downlink CC control signal generating section 201 has an SCH signal generating section 2011 that generates an SCH signal (Synchronization Channel signal) for each CC, a PBCH signal generating section 2012 that generates a PBCH signal (Physical Broadcast Channel signal), a Dynamic Broadcast Channel (DBCH) signal generating section 2013 that generates a broadcast information (DBCH) signal, and an RACH response signal and control signal generating section 2014 that generates an RACH response signal and control signal (MAC/RRC control signal).

The reception processing section has a multi-CC signal dividing section 212 that divides an uplink reception signal into a plurality of CC signals, an intra-uplink CC signal dividing section 211 that divides each intra-uplink CC signal, an uplink control signal receiving section 208 that receives an uplink control signal (layer1/layer 2 control signal), an uplink shared channel signal receiving section 209 that receives an uplink shared channel signal, and an uplink CC RACH receiving section 210 that receives an RACH signal of each uplink CC.

Further, the radio base station apparatus has a pair band assignment control section 205 that controls assignment of a downlink component carrier and an uplink component carrier (pair band) from the capability information of the mobile terminal apparatus, and a shared channel scheduler 204 that schedules a shared channel while including the pair band assignment information.

The SCH signal generating section 2011 generates a Synchronization Channel signal for the mobile terminal apparatus to perform a cell search. The generated SCH signal is multiplexed with other signals in the intra-downlink CC signal multiplexing section 202. Further, the PBCH signal generating section 2012 generates a PBCH signal including information of the bandwidth of the CC, the number of antennas, CC (accessible CC) capable of receiving the DBCH, etc. The generated PBCH signal is multiplexed with other signals in the intra-downlink CC signal multiplexing section 202.

The Dynamic Broadcast Channel signal generating section 2013 generates information (bandwidth and center frequency of the uplink CC to be paired) of the uplink CC paired with the downlink CC (initial downlink CC) as a broadcast information signal (Dynamic Broadcast Channel signal). Further, the Dynamic Broadcast Channel signal generating section 2013 generates the carrier aggregation information (the total bandwidth of aggregated CCs, or the number of aggregated CCs, and the center frequency thereof) concerning the initial downlink CC, an RACH parameter specific to the mobile terminal apparatus supporting the LTE-A, and/or the center frequency of a CC for transmitting the paging information specific to the mobile terminal apparatus supporting the LTE-A as a broadcast information signal (Dynamic Broadcast Channel signal). The generated broadcast information signal is multiplexed with other signals in the intra-downlink CC signal multiplexing section 202.

The RACH response signal and control signal generating section 2014 generates an RACH response signal that is a response signal to the RACH signal (preamble) and control signal (MAC/RRC control signal). At this point, the control signal includes the pair band assignment information of the downlink CC and the uplink CC sent from the shared channel scheduler 204. The generated RACH response signal and control signal are multiplexed with other signals in the intra-downlink CC signal multiplexing section 202.

The downlink control signal generating section 206 generates a downlink control signal based on schedule determined in the shared channel scheduler 204. The generated downlink control signal is multiplexed with other signals in the intra-downlink CC signal multiplexing section 202. The downlink shared channel signal generating section 207 generates a downlink shared channel signal using downlink transmission data from the upper layer, based on schedule determined in the shared channel scheduler 204. The generated downlink shared channel signal is multiplexed with other signals in the intra-downlink CC signal multiplexing section 202.

The uplink control signal receiving section 208 receives an uplink control signal divided in the intra-uplink CC signal dividing section 211, based on schedule determined in the shared channel scheduler 204. The uplink shared channel signal receiving section 209 receives an uplink shared channel signal divided in the intra-uplink CC signal dividing section 211, based on schedule determined in the shared channel scheduler 204. This uplink shared channel signal includes the information of the transmission/reception bandwidth of the mobile terminal apparatus in the uplink CC paired with the initial downlink CC including the Synchronization Channel signal used in the cell search. Among the uplink shared channel signal, the uplink transmission data is sent to the upper layer, and the information (UE capability information) of the transmission/reception bandwidth is sent to the pair band assignment control section 205.

The pair band assignment control section 205 generates the pair band assignment information of the uplink CC and the downlink CC based on the UE capability information, and sends the pair band assignment information to the shared channel scheduler 204. For example, when the transmission/reception bandwidth of the mobile terminal apparatus to assign the pair band is 40 MHz in the UE capability information, the section 205 determines that the uplink CC is 40 MHz, and that the downlink CC is a predetermined bandwidth (for example 60 MHz), and further determines the pair band of these uplink CC and downlink CC (pair band assignment).

The shared channel scheduler 204 performs scheduling of transmission and reception of uplink and downlink control signals and of uplink and downlink shared channels. Further, the shared channel scheduler 204 sends the pair band assignment information to the RACH response signal and control signal generating section 2014.

The uplink CC RACH signal receiving section 210 receives an RACH signal of each CC divided in the intra-uplink CC signal dividing section 211. The RACH signal includes the identification information of the LTE-A system. The uplink CC RACH signal receiving section 210 sends the uplink CC on which the RACH signal is received and the RACH signal reception sequence to the shared channel scheduler 204 together with the RACH parameter. Using information of the uplink CC on which the RACH signal is received and the RACH signal reception sequence, the shared channel scheduler 204 identifies the initial downlink CC and schedules transmission and reception of uplink and downlink shared channel signals and uplink and downlink control signals.

Figure 5:
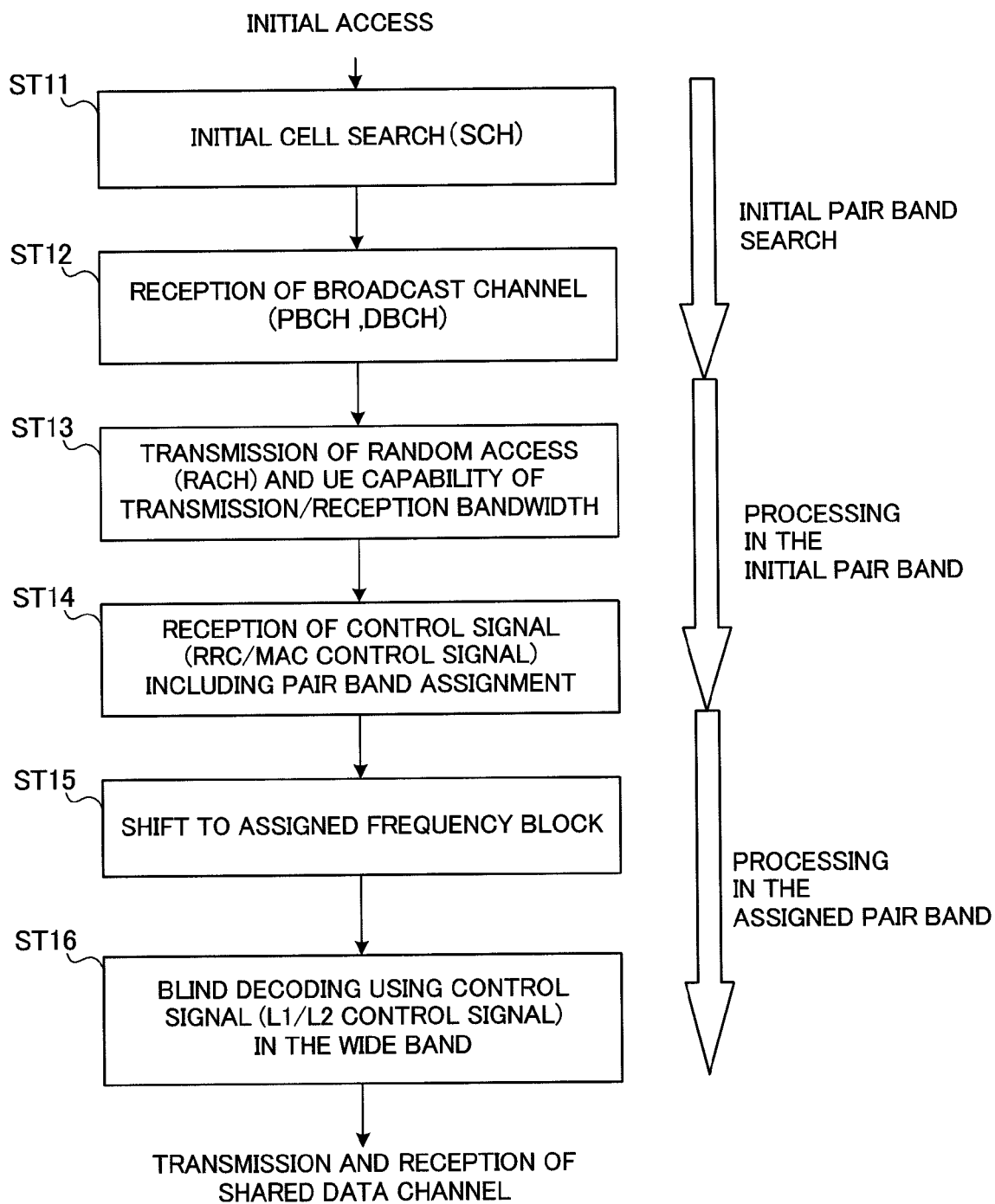
FIG. 5 is a diagram to explain an initial access procedure in the invention.

Described next is the case where initial access is made between the mobile terminal apparatus and radio base station apparatus each having the above-mentioned configuration. FIG. 5 is a diagram to explain an initial access procedure in the invention.

First, in the mobile terminal apparatus, the SCH signal receiving section 105 performs a cell search using an SCH signal included in one downlink CC among a plurality of downlink CCs (ST11). At this point, the CC to connect by the cell search is regarded as the initial downlink CC. Herein, in FIG. 8, downlink CC (DCC) downlink CC.

Figure 8:
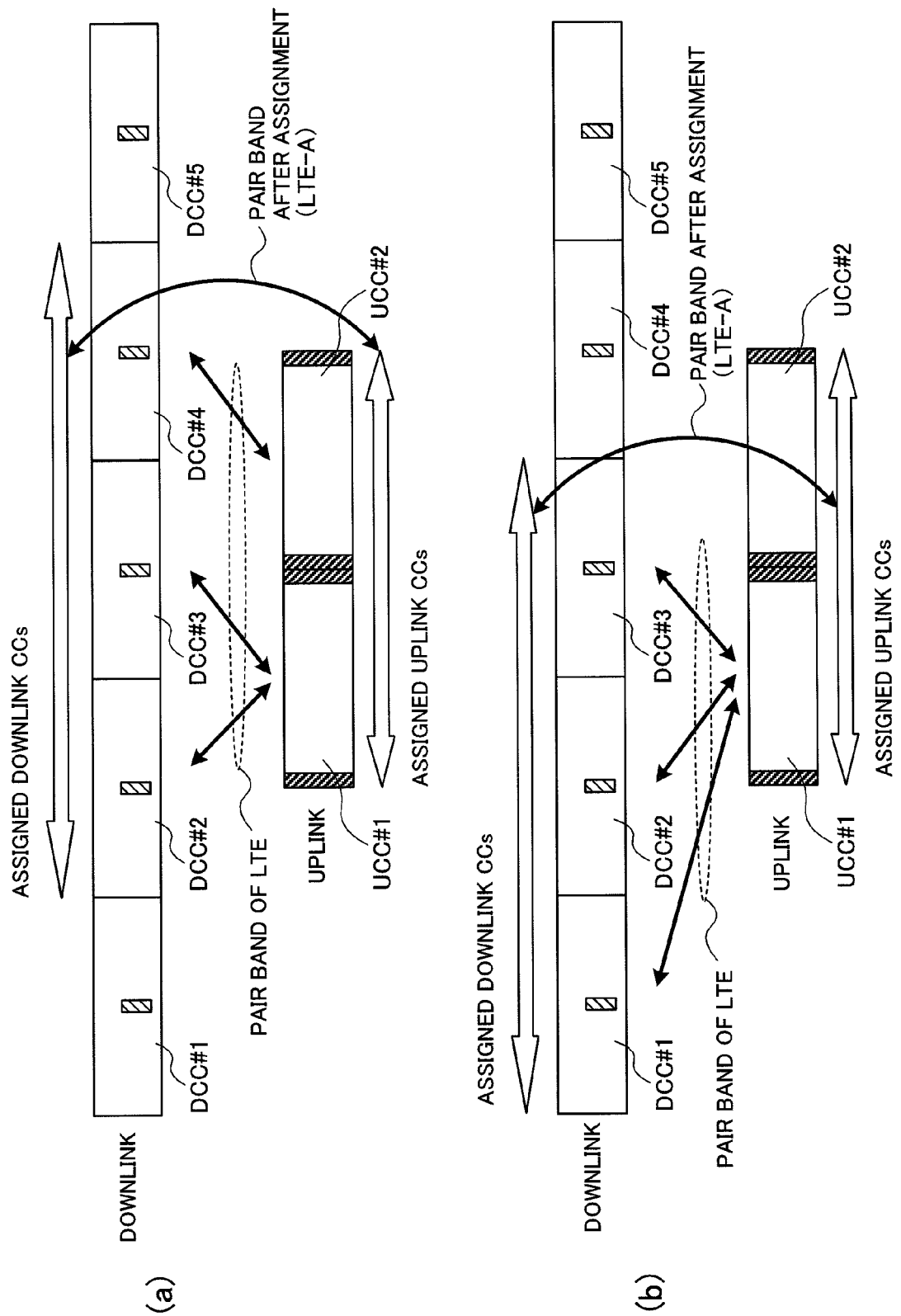
FIGS. 8(a) and 8(b) are diagrams to explain pair band assignment of uplink CC and downlink CC in the invention.

The radio base station apparatus generates a PBCH signal including the information (bandwidth, the number of antennas, etc.) of the initial downlink CC in the PBCH signal generating section 2012 and transmits the PBCH signal, and therefore, the mobile terminal apparatus receives the PBCH signal (ST12). Further, the radio base station apparatus generates a broadcast information signal (DBCH signal) including the information (bandwidth and center frequency) of the uplink CC paired with the initial downlink CC in the Dynamic Broadcast Channel signal generating section 2013 and transmits the broadcast information signal, and therefore, the mobile terminal apparatus receives the broadcast information signal (ST12). Herein, as shown in FIG. 8, the uplink CC paired with the DCC #2 is assumed to be the UCC #1.

At this point, using the information (bandwidth and the number of antennas) of the initial downlink CC in the received PBCH signal, the mobile terminal apparatus enables the bandwidth of a downlink reception signal to be extracted in the downlink reception signal bandwidth extracting section 102, while controlling the downlink reception center frequency in the downlink reception center frequency control section 101. Further, using the information (bandwidth and center frequency) of the uplink CC paired with the initial downlink CC in the received broadcast information signal, the mobile terminal apparatus limits the bandwidth of an uplink transmission signal in the uplink transmission signal bandwidth limiting section 114, while controlling the uplink transmission center frequency in the uplink transmission center frequency control section 115. By this means, the pair band of the initial downlink CC (DCC#2) and uplink CC (UCC#1) is determined (pair band of LTE). Up to this step, the initial pair band search is completed.

In the above-mentioned mobile communication system, the case is considered that the DBCH is not transmitted in all the downlink CCs. In this case, unless the UE is able to receive the downlink CC to transmit the DBCH, it is not possible to determine the above-mentioned pair band. Therefore, when the DBCH is not transmitted in all the downlink CCs, the information of a CC capable of receiving the DBCH is notified on the PBCH, and based on the information, the pair band is determined.

Figure 6:
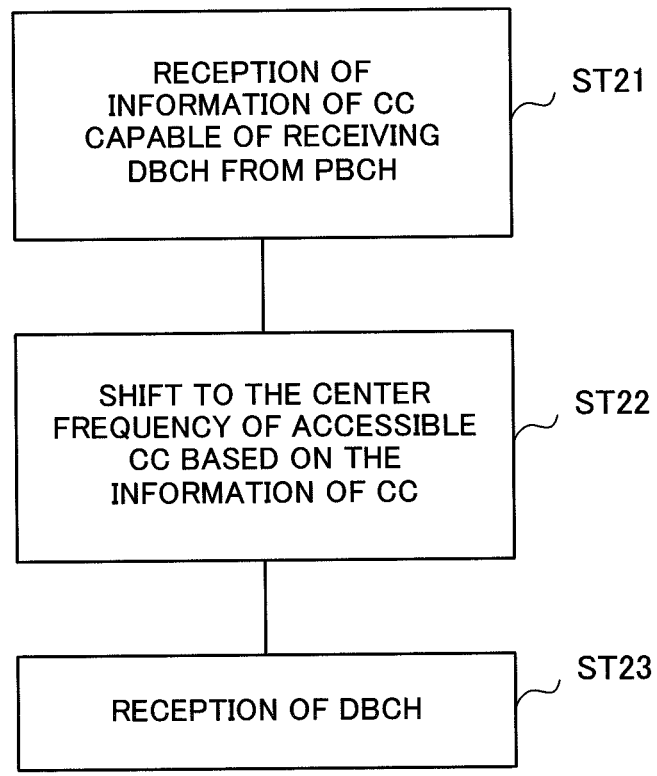
FIG. 6 is a diagram to explain another example of the initial access procedure in the invention.
Figure 7:
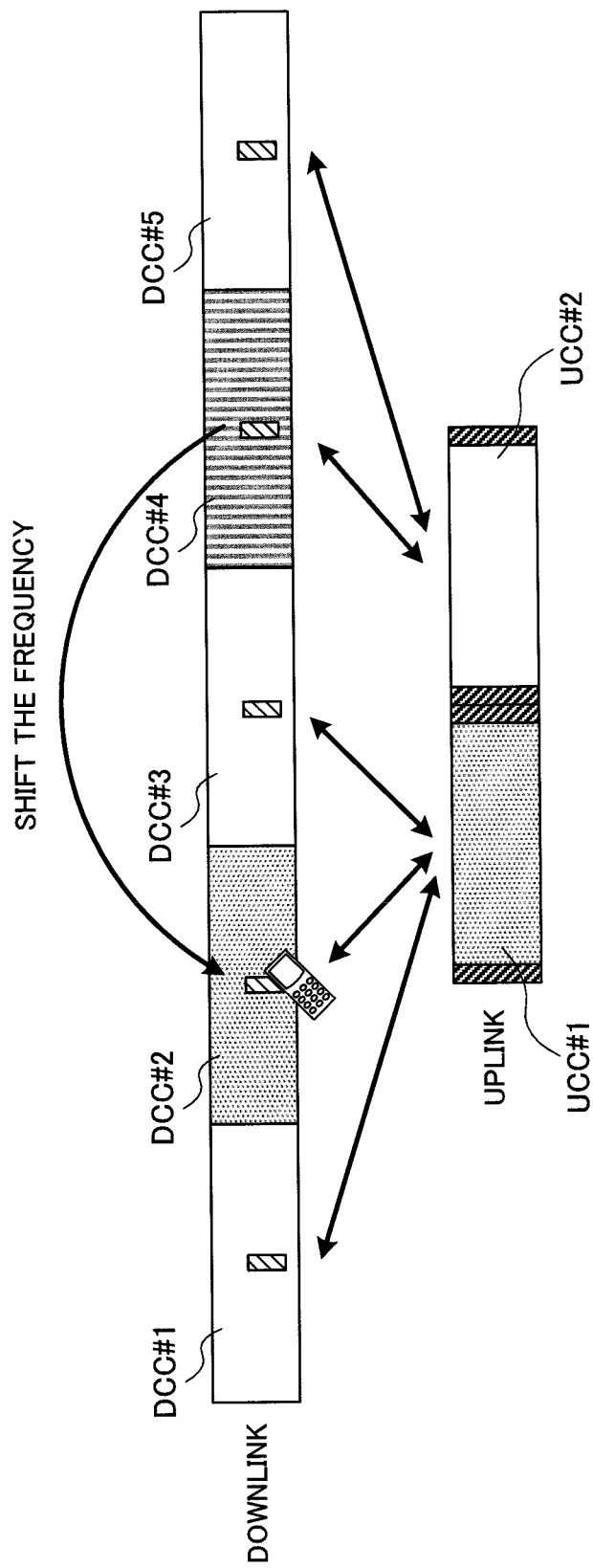
FIG. 7 is a diagram to explain pair band assignment of uplink CC and downlink CC in the invention.

The pair band determination in this case will be described with reference to FIGS. 6 and 7.

First, in the mobile terminal apparatus, the SCH signal receiving section 105 performs a cell search using an SCH signal included in one downlink CC among a plurality of downlink CCs. At this point, the CC to connect by the cell search is regarded as the initial downlink CC. Herein, in FIG. 7, downlink CC (DCC) #4 is assumed to be the initial downlink CC.

The radio base station apparatus generates a PBCH signal including the information (bandwidth, the number of antennas, CC (accessible CC) capable of receiving the DBCH, etc.) of the initial downlink CC in the PBCH signal generating section 2012 and transmits the PBCH signal, and therefore, the mobile terminal apparatus receives the PBCH signal (ST21). Herein, in FIG. 7, downlink CC (DCC) #2 is assumed to be the accessible CC. Next, based on the information of the CC broadcast on the PBCH, the mobile terminal apparatus shifts the center frequency to that of the accessible CC (ST22).

Then, the mobile terminal apparatus receives the DBCH signal of the accessible CC (ST23), and using the information (bandwidth and center frequency) of the uplink CC paired with the initial downlink CC, limits the bandwidth of an uplink transmission signal in the uplink transmission signal bandwidth limiting section 114, while controlling the uplink transmission center frequency in the uplink transmission center frequency control section 115. By this means, the pair band of the accessible downlink CC (DCC#2) and uplink CC (UCC#1) is determined (pair band of LTE). Up to this step, the initial pair band search is completed. By this means, it is possible to determine the pair band also in the case where the DBCH is not transmitted in all the downlink CCs.

FIGS. 8(a) and 8(b) are diagrams illustrating pair band assignment of the uplink CC and initial downlink CC. As pair band assignment of the initial downlink CC and uplink CC, as shown in FIG. 8(a), uplink CCs may be set freely. For example, the initial downlink CCs (DCC#2 and DCC#3) are assigned to the UCC#1 as an uplink CC of a pair band, while the initial downlink CC (DCC #4) is assigned to the UCC#2 as an uplink CC of a pair band. Alternately, as pair band assignment of the initial downlink CC and uplink CC, as shown in FIG. 8(b), the uplink CC may be limited to set. For example, the initial downlink CCs (DCC#1, DCC#2 and DCC#3) are all assigned to the UCC#1 as an uplink CC of a pair band.

Further, the radio base station apparatus generates a broadcast information signal (DBCH signal) including an RACH parameter enabling whether the mobile terminal apparatus is an LTE-A terminal to be identified in the Dynamic Broadcast Channel signal generating section 2013 and transmits the broadcast information signal, and therefore, the mobile terminal apparatus receives the broadcast information signal. The mobile terminal apparatus generates an RACH signal based on the received RACH parameter in the RACH signal generating section 112, and transmits the RACH signal to the radio base station apparatus (random access) in the uplink CC (UCC#1) (ST13).

The radio base station apparatus receives the RACH signal in the uplink CC RACH signal receiving section (herein, the RACH signal receiving section of the UCC#1) 210, generates an RACH response signal in the RACH response signal and control signal generating section 2014, and transmits the RACH response signal to the mobile terminal apparatus in the initial downlink CC (DCC#2). After receiving the RACH response signal, the mobile terminal apparatus generates an uplink shared channel signal in the uplink shared channel signal generating section 111, and transmits the uplink shared channel signal to the radio base station apparatus on the PUSCH (Physical Uplink Shared Channel) of the uplink CC (UCC#1). At this point, the uplink shared channel includes the information (UE capability information) of the transmission/reception bandwidth of the mobile terminal apparatus, and the radio base station apparatus is notified of the UE capability information (ST13).

Figure 9:
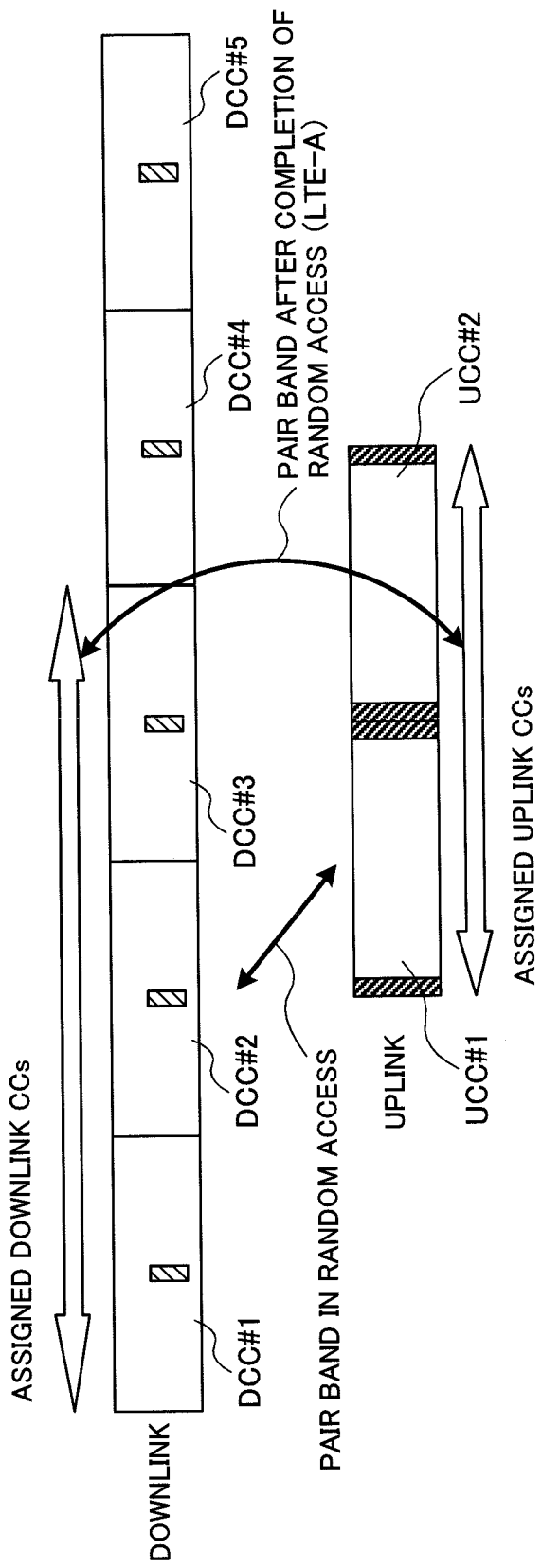
FIG. 9 is a diagram to explain pair band assignment in the invention.

Further, the mobile terminal apparatus generates an uplink shared channel signal including the UE capability information (information of the transmission/reception bandwidth of the mobile terminal apparatus) in the uplink shared channel signal generating section 111, and transmits the uplink shared channel signal to the radio base station apparatus in the uplink CC (UCC#1) (ST13). In the radio base station apparatus, the uplink shared channel signal receiving section 209 receives the uplink shared channel signal, and sends the UE capability information to the pair band assignment control section 205. Upon receiving the UE capability information, the pair band assignment information control section 205 assigns a pair band of uplink and downlink CCs based on the UE capability (herein, the bandwidth (40 MHz) corresponding to two CCs). Herein, as shown in FIG. 9, UCC#1 and UCC#2 are assigned to uplink, and DCC#1, DCC#2 and DCC#3 are assigned to downlink. The pair band assignment control section 205 sends the pair band assignment information to the shared channel scheduler 204. The shared channel scheduler 204 schedules uplink and downlink control signals and uplink and downlink shared channel signals using the pair band assignment information. Further, the radio base station apparatus generates a control signal (MAC/RRC control signal) in the RACH response signal and control signal generating section 2014, and transmits the control signal to the mobile terminal apparatus on the PDSCH (Physical Downlink Shared Channel) of the downlink CC (DCC#2). At this point, the control signal (MAC/RRC control signal) includes the pair band assignment information, and the mobile terminal apparatus is notified of the pair band assignment information (ST14). Up to this step, the processing of the initial pair band is finished.

Figure 10:
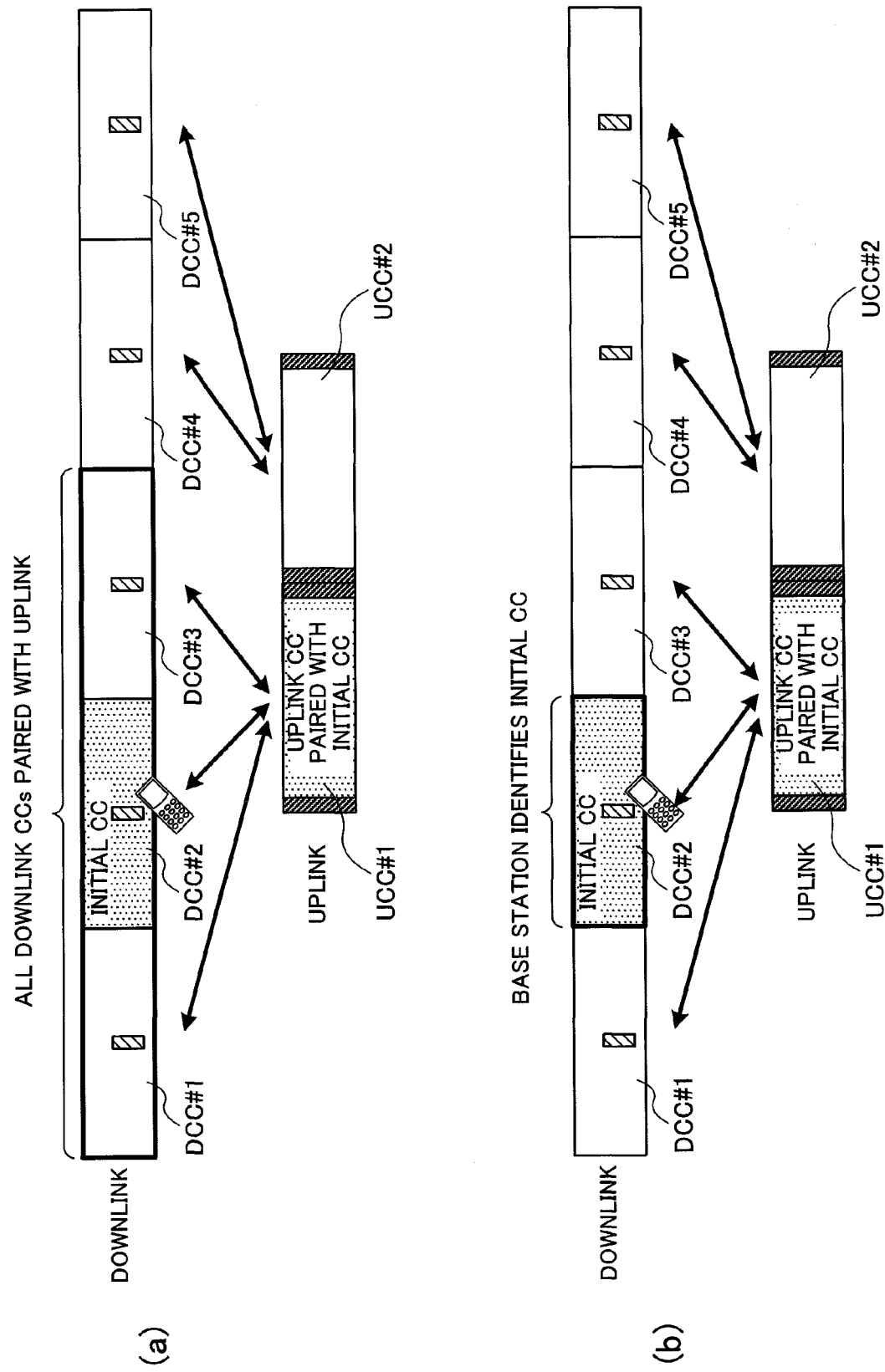
FIGS. 10(a) and 10(b) are diagrams to explain a transmission method of a control signal (MAC/RRC control signal)

Herein, as a method of transmitting a control signal (MAC/RRC control signal) including an RACH response signal and pair band assignment information, as shown in FIG. 10(a), the RACH response signal and control signal may be transmitted in parallel from all the downlink CCs each paired with the uplink CC (UCC#1) on which the RACH signal is received. Alternately, as shown in FIG. 10(b), the setting may be made beforehand to enable the initial downlink CC to be identified using an RACH signal reception sequence, so that the shared channel scheduler 204 identifies the initial downlink CC using the RACH signal reception sequence, and that the RACH response signal and control signal are transmitted in the identified initial downlink CC.

Next, the processing is performed on the assigned pair band. In the mobile terminal apparatus, when the RACH response signal and control signal receiving section 1072 receives a control signal including the pair band assignment information, the pair band assignment information is sent to the pair band assignment information storing section 103 and stored. The pair band assignment information is sent to the downlink reception signal bandwidth extracting section 102, downlink reception center frequency control section 101, uplink transmission signal bandwidth limiting section 114 and uplink transmission center frequency control section 115, and the frequency is adjusted (shifted) based on the assigned pair band in each processing section (ST15). More specifically, the downlink reception center frequency control section 101 adjusts to the center frequency of the bandwidth (aggregated CCs) of the downlink CCs (DCC#1, DCC#2 and DCC#3), and the downlink reception signal bandwidth extracting section 102 extracts a downlink reception signal at the bandwidth of the downlink CCs (DCC#1, DCC#2 and DCC#3). Further, the uplink transmission center frequency control section 115 adjusts to the center frequency of the bandwidth (aggregated CCs) of the uplink CCs (UCC#1 and UCC#2), and the uplink transmission signal bandwidth limiting section 114 limits the uplink transmission signal to the bandwidth of the uplink CCs (UCC#1 and UCC#2). By this means, the mobile terminal apparatus communicates with the radio base station apparatus using the assigned frequency band of the wide band. Then, the mobile terminal apparatus receives downlink control signal (layer1/layer2 control signal), checks the user ID, and decodes the radio resource assignment information associated with the user ID (blind decoding) (ST16). Subsequently, the mobile terminal apparatus transmits and receives the shared data channel.

Thus, as shown in FIG. 9, in random access, the pair band (DCC#2-UCC#1) is determined as in the LTE system, the UE capability information and pair band assignment information is transmitted and received using the pair band, and the pair band (DCC#1, DCC#2, DCC#3-UCC#1, UCC#2) assigned to the wide band is determined. Therefore, when a plurality of mobile communication systems (LTE system and LTE-A system) coexists, it is possible to perform initial access corresponding to each of the mobile communication systems.

The present invention is not limited to the above-mentioned Embodiment, and is capable of being carried into practice with various modifications thereof. For example, without departing from the scope of the invention, the assignment of component carriers, the number of processing sections, processing procedures, the number of component carriers, and the number of aggregated component carriers are capable of being carried into practice with modifications thereof as appropriate. Further, the invention is capable of being carried into practice with modifications thereof as appropriate without departing from the scope of the invention.

The invention claimed is:

1. A mobile terminal apparatus capable of communicating with a plurality of downlink component carriers, comprising:
    a cell search section configured to perform cell search using a synchronization channel signal included in one downlink component carrier among the downlink component carriers; and
    a receiving section configured to receive information of an uplink component carrier paired with an initial downlink component carrier, the initial downlink component carrier being the downlink component carrier including the synchronization channel signal used in the cell search,
    wherein the mobile terminal apparatus receives a response signal of a random access channel signal in the initial downlink component carrier identified by a random access signal sequence.

2. The mobile terminal apparatus according to claim 1, wherein the mobile terminal apparatus receives assignment information for assigning component carriers in the initial downlink component carrier.

3. The mobile terminal apparatus according to claim 2, wherein a number of uplink component carriers to assign is equal to or smaller than a number of downlink component carriers to assign.

4. A radio base station apparatus capable of communicating with a plurality of downlink component carriers, comprising:
    a transmitting section configured to transmit information of uplink component carriers paired with respective downlink component carriers; and
    a receiving section configured to receive a random access signal sequence transmitted from a mobile terminal apparatus, in an uplink component carrier paired with a downlink component carrier including a synchronization channel signal used in cell search by the mobile terminal apparatus,
    wherein the radio base station apparatus transmits a response signal of a random access channel signal in an initial downlink component carrier identified by the random access signal sequence.

5. The radio base station apparatus according to claim 4, wherein the radio base station apparatus transmits assignment information for assigning component carriers in an initial downlink component carrier identified by the random access signal sequence.

6. The radio base station apparatus according to claim 5, wherein a number of uplink component carriers to assign to the mobile terminal apparatus is equal to or smaller than a number of downlink component carriers to assign.

7. A radio communication system capable of communicating with a plurality of downlink component carriers, comprising:
    a mobile terminal apparatus, having
    a cell search section configured to perform cell search using a synchronization channel signal included in one downlink component carrier among the downlink component carriers; and
    a receiving section configured to receive information of an uplink component carrier paired with an initial downlink component carrier, the initial downlink component carrier being the downlink component carrier including the synchronization channel signal used in the cell search; and
    a radio base station apparatus, having
    a transmitting section configured to transmit information of uplink component carriers paired with respective downlink component carriers; and
    a receiving section configured to receive a random access signal sequence transmitted from the mobile terminal apparatus, in the uplink component carrier paired with the downlink component carrier including the synchronization channel signal used in the cell search by the mobile terminal apparatus,
    wherein the mobile terminal apparatus receives a response signal of a random access channel signal in the initial downlink component carrier identified by the random access signal sequence.

8. A radio communication method capable of communicating with a plurality of downlink component carriers, the method comprising the steps of:
    in a mobile terminal apparatus,
    performing cell search using a synchronization channel signal included in one downlink component carrier among the downlink component carriers; and
    receiving information of an uplink component carrier paired with an initial downlink component carrier, the initial downlink component carrier being the downlink component carrier including the synchronization channel signal used in the cell search; and
    in a radio base station apparatus,
    transmitting information of uplink component carriers paired with respective downlink component carriers; and
    receiving a random access signal sequence transmitted from the mobile terminal apparatus, in the uplink component carrier paired with the downlink component carrier including the synchronization channel signal used in the cell search by the mobile terminal apparatus, wherein the mobile terminal apparatus receives a response signal of a random access channel signal in the initial downlink component carrier identified by the random access signal sequence.

* * * * *